(12) United States Patent
Kimura

(10) Patent No.: US 10,988,043 B2
(45) Date of Patent: Apr. 27, 2021

(54) VEHICLE AND METHOD OF CHARGING ELECTRIC POWER STORAGE DEVICE

(71) Applicant: Toyota Jidosha Kabushiki Kaisha, Toyota (JP)

(72) Inventor: Masaru Kimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 271 days.

(21) Appl. No.: 16/267,866

(22) Filed: Feb. 5, 2019

(65) Prior Publication Data

US 2019/0241088 A1    Aug. 8, 2019

(30) Foreign Application Priority Data

Feb. 8, 2018 (JP) .............................. JP2018-021241

(51) Int. Cl.
| | |
|---|---|
| *B60L 53/62* | (2019.01) |
| *B60L 53/20* | (2019.01) |
| *H02M 1/42* | (2007.01) |
| *H02M 3/335* | (2006.01) |
| *B60L 50/51* | (2019.01) |
| *H02M 5/458* | (2006.01) |
| *H02M 1/00* | (2006.01) |

(52) U.S. Cl.
CPC ............. *B60L 53/62* (2019.02); *B60L 50/51* (2019.02); *B60L 53/20* (2019.02); *H02M 1/4208* (2013.01); *H02M 1/4233* (2013.01); *H02M 1/4258* (2013.01); *H02M 3/335* (2013.01); *H02M 3/33569* (2013.01); *H02M 5/458* (2013.01); *B60L 2210/10* (2013.01); *H02M 2001/007* (2013.01)

(58) Field of Classification Search
CPC ...................................................... B60L 53/62
USPC ............................................................ 320/109
See application file for complete search history.

(56) References Cited

U.S. PATENT DOCUMENTS

| | | | |
|---|---|---|---|
| 2012/0065827 A1* | 3/2012 | Kimura ................... | B60L 58/18 701/22 |
| 2013/0069599 A1* | 3/2013 | Kimura ................... | B60L 53/62 320/162 |

(Continued)

FOREIGN PATENT DOCUMENTS

| | | |
|---|---|---|
| JP | 5413507 B2 | 2/2014 |
| WO | 2012004846 A1 | 1/2012 |

*Primary Examiner* — Jerry D Robbins
(74) *Attorney, Agent, or Firm* — Dinsmore & Shohl LLP

(57) ABSTRACT

A vehicle includes an electric power converter; an electric power storage device; a control unit. The control unit is configured to i) increase command electric power stepwise by a specified reference amount toward target electric power, ii) after the command electric power reaches the target electric power, reduce the command electric power each time a voltage of the electric power storage device exceeds a first threshold voltage, and iii) stop supply of electric power from an external power supply when the voltage of the electric power storage device reaches a second threshold voltage that is higher than the first threshold voltage. The specified reference amount is set such that an increased amount of the voltage of the electric power storage device at each step of increasing the command electric power is smaller than a voltage difference between the second threshold voltage and the first threshold voltage.

5 Claims, 11 Drawing Sheets

(56) References Cited

U.S. PATENT DOCUMENTS

2013/0096760 A1\* 4/2013 Izumi .................... B60L 3/0046
 701/22
2017/0279288 A1\* 9/2017 Kimura ................ B60L 3/0046

\* cited by examiner

VEHICLE AND METHOD OF CHARGING ELECTRIC POWER STORAGE DEVICE

CROSS-REFERENCE TO RELATED APPLICATION

This application claims priority to Japanese Patent Application No. 2018-021241 filed on Feb. 8, 2018, incorporated herein by reference in its entirety.

BACKGROUND

1. Technical Field

The present disclosure relates to a vehicle and a method of charging an electric power storage device, and in particular, to a technique of charging an electric power storage device provided in a vehicle with the use of electric power supplied from a system power supply.

2. Description of Related Art

In recent years, development of a vehicle in which an electric power storage device can be charged with electric power supplied from a system power supply has been advanced, and examples of such a vehicle include a plug-in hybrid vehicle and an electric vehicle. In these vehicles, it is desired that the electric power storage device should be charged to be brought to a nearly full-charge state in order to secure the longest possible travelable distance (i.e., the longest possible EV travel distance). Thus, various charging methods for achieving the full-charge state of the electric power storage device have been proposed.

For example, WO2012/004846 discloses a vehicle control apparatus that appropriately uses both of an open-circuit voltage (OCV) and a closed-circuit voltage (CCV) as voltage values of an in-vehicle electric power storage device. More specifically, the vehicle control apparatus disclosed in WO2012/004846 executes first charging control to charge the electric power storage device at an upper limit value of charging electric power with the use of an external power supply, and terminates the first charging control when the CCV detected by a voltage sensor becomes equal to or higher than a first threshold that is the OCV corresponding to the full-charge state. Thereafter, the vehicle control apparatus executes second charging control to charge the electric power storage device with the constant charging electric power that is lower than the charging electric power in the first charging control. The vehicle control apparatus terminates the second charging control when the CCV becomes equal to or higher than a second threshold that is the CCV corresponding to the full-charge state.

SUMMARY

In general, internal resistance of the in-vehicle electric power storage device may need to be as low as possible, in order to reduce energy loss and to expand a voltage range within which the in-vehicle electric power storage device can be charged and discharged. However, some in-vehicle electric power storage devices have relatively high internal resistance due to the configurations thereof. In addition, the internal resistance of the electric power storage device may be increased depending on an environment where the electric power storage device is placed (for example, a low-temperature environment).

The inventor has focused on a fact that, depending on the internal resistance of the electric power storage device, it may be difficult to charge the electric power storage device such that the electric power storage device is brought to the nearly full-charge state only by executing the control based on the voltage values of the electric power storage device as disclosed in WO 2012/004846.

The present disclosure provides a technique that makes it possible to charge an electric power storage device until the electric power storage device is brought to a nearly full-charge state in a vehicle and in a method of charging the electric power storage device.

(1) A first aspect of the disclosure relates to a vehicle including an electric power converter configured to convert electric power supplied from an external power supply; an electric power storage device having internal resistance higher than a specified value, the electric power storage device being configured to store the electric power converted by the electric power converter; and a control unit configured to control the electric power converter such that the electric power corresponding to command electric power is supplied from the external power supply and constant power charging of the electric power storage device is performed. The control unit is configured to i) increase the command electric power stepwise by a specified reference amount toward target electric power, ii) after the command electric power reaches the target electric power, reduce the command electric power each time a voltage of the electric power storage device exceeds a first threshold voltage, and iii) stop supply of the electric power from the external power supply when the voltage of the electric power storage device reaches a second threshold voltage that is higher than the first threshold voltage. The specified reference amount is set such that an increased amount of the voltage of the electric power storage device at each step of increasing the command electric power is smaller than a voltage difference between the second threshold voltage and the first threshold voltage.

In the configuration described in (1), the increased amount of the voltage of the electric power storage device at each step of increasing the command electric power is set to be smaller than the voltage difference between the second threshold voltage and the first threshold voltage. Although the detail will be described later, it is possible to reduce the possibility that the voltage of the electric power storage device exceeds the first threshold voltage and reaches the second threshold voltage due to an increase in the command electric power. Accordingly, the voltage of the electric power storage device can be maintained in the vicinity of the first threshold voltage, and the command electric power can be gradually reduced (the detail will be described later). As a result, the charging can be continued until the electric power storage device is brought to a nearly full-charge state.

(2) The external power supply may be a system power supply. The control unit may be configured to execute first increase control that increases the command electric power stepwise by the specified reference amount, and second increase control that increases the command electric power stepwise by a specified increase amount that is larger than the specified reference amount and is smaller than an increase amount that causes a flicker in the system power supply. The control unit may be configured to execute the second increase control in a case where the command electric power is increased again toward the target electric power after the command electric power is reduced to zero, and to execute the first increase control in a case where the command electric power is increased again toward the target electric power after the command electric power is reduced such that the command electric power does not reach zero.

As described with regard to (1), the electric power storage device can be charged until the electric power storage device is brought to the nearly full-charge state by executing the first increase control. However, in the first increase control, the increase amount, by which the command electric power is increased, is smaller than that in the second increase control. Accordingly, in the first increase control, a charging period for the electric power storage device is longer than the charging period in the second increase control. Accordingly, with the configuration described in (2), when a condition that the command electric power is increased again toward the target electric power after the command electric power is reduced to zero is satisfied, the second increase control is executed. Thus, the charging period for the electric power storage device can be reduced.

Although the detail will be described later, a reason why the second increase control can be executed is as follows. That is, the electric power storage device is not fully charged before the reduction in the command electric power. In addition, the electric power storage device is not charged while the command electric power is zero. Accordingly, an OCV of the electric power storage device at the time when the command electric power starts to be increased again is equal to the OCV of the electric power storage device before the reduction in the command electric power. In addition, even in the case where the increase amount, by which the command electric power is increased at the time when the command electric power starts to be increased again, is relatively large, that is, even in the case where the increase amount, by which the command electric power is increased, is equal to the reduction amount by which the command electric power is reduced, the increased amount of the voltage of the electric power storage device (a product of a charge current I and the internal resistance R) is merely equal to a reduced amount of the voltage during the reduction in the command electric power. Thus, even when the voltage of the electric power storage device (=OCV+I×R) is increased due to the second increase control, the voltage of the electric power storage device does not reach the second threshold voltage.

(3) The control unit may be configured to execute the second increase control until the command electric power reaches a positive value from zero and to execute the first increase control until the command electric power reaches the target electric power from the positive value, in a case where the command electric power is increased again toward the target electric power after the command electric power is reduced from the positive value to zero.

In the configuration described in (3), the second increase control is executed until the command electric power reaches the positive value from zero, that is, until the command electric power is returned to the value set before the reduction. As described in (2), this is because, even when the voltage of the electric power storage device is increased due to the second increase control, the voltage of the electric power storage device does not reach the second threshold voltage. The charging period for the electric power storage device can be reduced by executing the second increase control. After the command electric power reaches the positive value, the voltage of the electric power storage device may reach the second threshold voltage when the voltage of the electric power storage device is increased by the increased amount due to the second increase control. Thus, after the command electric power reaches the positive value, the first increase control is executed. Thus, the electric power storage device can be charged until the electric power storage device is brought to the nearly full-charge state.

(4) The vehicle may further include a current sensor configured to detect a current flowing into and out of the electric power storage device. The control unit may be configured to periodically reduce the command electric power to zero, and to acquire a value of the current sensor that is detected in a state where the command electric power is zero, as an offset value of the current sensor.

In the configuration described in (4), the offset value of the current sensor is periodically acquired. Thus, the electric power converter can be controlled with a high degree of accuracy.

(5) A second aspect of the disclosure relates to a method of charging an electric power storage device with electric power supplied from an external power supply. The electric power storage device is provided in a vehicle and has internal resistance higher than a specified value. The vehicle includes an electric power converter configured to convert the electric power supplied from the external power supply and to perform constant power charging of the electric power storage device. The method includes increasing command electric power for the electric power converter stepwise by a reference amount toward target electric power; after the command electric power reaches the target electric power, reducing the command electric power each time a voltage of the electric power storage device exceeds a first threshold voltage; and stopping supply of the electric power from the external power supply when the voltage of the electric power storage device reaches a second threshold voltage that is higher than the first threshold voltage. The reference amount is set such that an increased amount of the voltage of the electric power storage device at each step of increasing the command electric power is smaller than a voltage difference between the second threshold voltage and the first threshold voltage.

According to the method described in (5), the electric power storage device can be charged until the electric power storage device is brought to the nearly full-charge state, as in the configuration described in (1).

According to the present disclosure, the electric power storage device can be charged until the electric power storage device is brought to the nearly full-charge state in the vehicle and in the method of charging the electric power storage device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Figure 1:
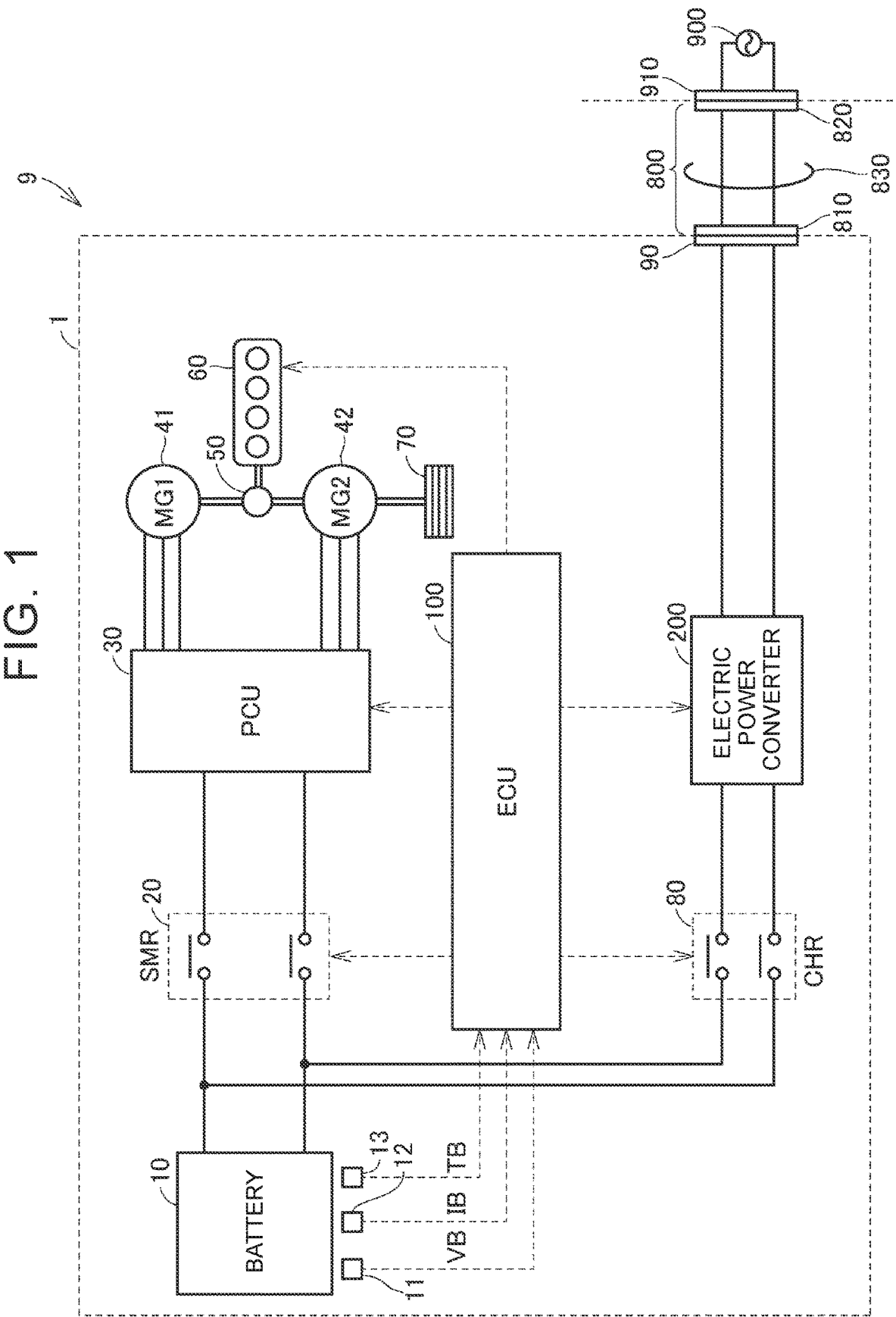
FIG. 1 is a block diagram that schematically shows an overall configuration of a charging system including a vehicle according to a first embodiment.

A detailed description will hereinafter be provided on embodiments of the present disclosure with reference to the drawings. Note that the same or corresponding portions in the drawings will be denoted by the same reference numerals and the description thereof will not be repeated.

In the embodiments, which will be described below, a description will be provided on a configuration example in which a vehicle according to the present disclosure is a plug-in hybrid vehicle. However, the vehicle according to the present disclosure is not limited to the plug-in hybrid vehicle as long as an in-vehicle electric power storage device can be charged by electric power supplied from a system power supply, and the vehicle may be an electric vehicle.

FIG. 1 is a block diagram that schematically shows an overall configuration of a charging system including a vehicle according to a first embodiment. With reference to FIG. 1, a charging system 9 includes a vehicle 1 and a system power supply 900. The vehicle 1 and the system power supply (external power supply) 900 can be connected to each other by a charge cable 800. The charge cable 800 includes a connector 810, a plug 820 configured to be mechanically connectable to an outlet 910 of the system power supply 900, and a power line 830 that connects the connector 810 and the plug 820.

The vehicle 1 includes a battery 10, a system main relay (SMR) 20, a power control unit (PCU) 30, motor generators 41, 42, a power transmission gear 50, an engine 60, a drive wheel 70, a charge relay (CHR) 80, an electric power converter 200, an inlet 90, and an electronic control unit (ECU) 100.

The battery (electric power storage device) 10 is a secondary battery such as a lithium-ion secondary battery or a nickel hydride battery. The battery 10 is electrically connected to the PCU 30 via the SMR 20. The battery 10 supplies electric power used to generate a driving force for the vehicle 1 to the PCU 30. The battery 10 also stores the electric power generated by the motor generators 41, 42. Note that, instead of the battery 10, a capacitor such as an electric double-layered capacitor may be adopted.

The battery 10 is provided with a voltage sensor 11, a current sensor 12, and a temperature sensor 13. The voltage sensor 11 detects a voltage VB of the battery 10. The current sensor 12 detects a current IB flowing into and out of the battery 10. The temperature sensor 13 detects a temperature TB of the battery 10. Each of the sensors outputs a detection value to the ECU 100. Based on these detection values, the ECU 100 controls charging and discharging of the battery 10 and estimates a SOC of the battery 10. Note that the current sensor 12 may be regarded as the "current sensor" according to the present disclosure.

The SMR 20 is electrically connected between the battery 10 and the PCU 30. In response to a control signal from the ECU 100, the SMR 20 allows and interrupts the supply of electric power from the battery 10 to the PCU 30 and from the PCU 30 to the battery 10.

The PCU 30 includes a converter and an inverter, which are not shown. The converter boosts a direct-current (DC) voltage from the battery 10. In response to a control signal from the ECU 100, the inverter converts the DC voltage from the converter to an alternating-current (AC) voltage and outputs the AC voltage to the motor generators 41, 42.

Each of the motor generators 41, 42 is an AC rotary electric machine and is a three-phase AC permanent magnet synchronous motor, for example. Output torque from the motor generators 41, 42 is transmitted to the drive wheel 70 via the power transmission gear 50 configured to include a reducer and a power split mechanism.

When the engine 60 is started, the motor generator 41 uses the electric power of the battery 10 to rotate a crankshaft of the engine 60. In addition, the motor generator 41 can generate the electric power with the use of power of the engine 60. AC power generated by the motor generator 41 is converted to DC power by the PCU 30 and the DC power is stored in the battery 10. There is a case where the AC power generated by the motor generator 41 is supplied to the motor generator 42.

The motor generator 42 uses at least one of the electric power supplied from the battery 10 and the electric power generated by the motor generator 41 to rotate a driveshaft. In addition, the motor generator 42 can generate the electric power by performing regenerative braking. The AC power generated by the motor generator 42 is converted to the DC power by the PCU 30 and the DC power is stored in the battery 10.

The engine 60 is an internal combustion engine such as a gasoline engine or a diesel engine. In response to a control signal from the ECU 100, the engine 60 generates the power used to cause the vehicle 1 to travel.

The CHR 80 is electrically connected between the battery 10 and the electric power converter 200. In response to a control signal from the ECU 100, the CHR 80 allows and interrupts the supply of electric power from the electric power converter 200 to the battery 10.

The inlet 90 is provided on an outer surface of the vehicle 1 and is configured such that the connector 810 of the charge cable 800 can be mechanically connected to the inlet 90. The electric power from the system power supply 900 is supplied to the vehicle 1 via the charge cable 800 and the inlet 90.

The electric power converter 200 is electrically connected to the battery 10 via the CHR 80 and is also electrically connected to the inlet 90. In response to a control signal from the ECU 100, the electric power converter 200 converts the AC power supplied from the system power supply 900 to the DC power and outputs the DC power to the battery 10.

The ECU 100 is configured to include a central processing unit (CPU), memory, input-output ports, and the like, which are not shown. The ECU 100 controls various kinds of devices on the basis of signals from the sensors and the devices, and a map and a program stored in the memory, so as to achieve a desired travel state of the vehicle 1. An example of primary control executed by the ECU 100 is "external charging control". In the external charging control, the battery 10 is charged with the electric power supplied from the system power supply 900. The external charging control will be described below in detail.

Figure 2:
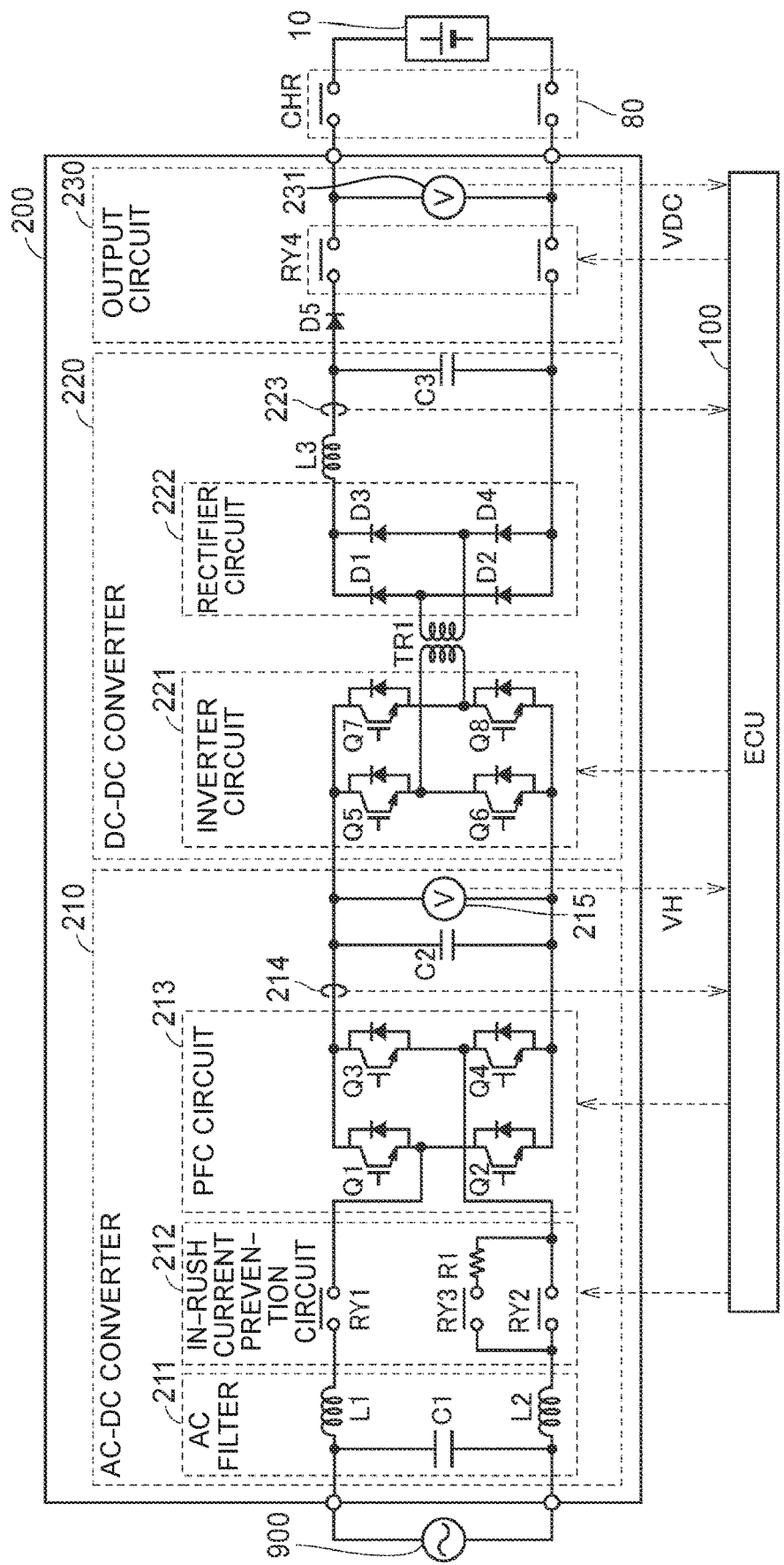
FIG. 2 is a circuit block diagram that shows an example of the configuration of an electric power converter in detail.

FIG. 2 is a circuit block diagram that shows an example of the configuration of the electric power converter 200 in detail. With reference to FIG. 2, the electric power converter 200 includes an AC-DC converter 210, a DC-DC converter 220, and an output circuit 230.

The AC-DC converter 210 converts the AC power supplied from the system power supply 900 to the DC power. The AC-DC converter 210 includes an AC filter 211, an in-rush current prevention circuit 212, a power factor correction (PFC) circuit 213, a current sensor 214, a capacitor C2, and a voltage sensor 215.

The AC filter 211 includes reactors L1, L2 and a capacitor C1. The reactors L1, L2 are respectively provided in positive and negative-side power lines. The capacitor C1 is connected between the above-described power lines. The AC filter 211 eliminates a noise component contained in the AC power that is supplied from the system power supply 900.

The in-rush current prevention circuit 212 includes relays RY1 to RY3 and a resistor R1. The relays RY1, RY2 are respectively provided in the positive and negative-side power lines. Each of the relays RY1, RY2 allows and interrupts the supply of electric power from the system power supply 900. The relay RY3 and the resistor R1 are connected in series to each other and are connected in parallel with the relay RY2. At power-on of the electric power converter 200, the relay RY2 remains in an opened state, and the relays RY1, RY3 are closed. Because part of the current is consumed by the resistor R1, the current flowing into the capacitor C2 can be reduced, and the in-rush current to the capacitor C2 is prevented. When pre-charge of the capacitor C1 is completed, the relay RY2 is closed, and then, the relay RY3 is opened.

The PFC circuit 213 includes switching elements Q1 to Q4. A full bridge is formed by the switching elements Q1 to Q4. Each of the switching elements Q1 to Q4 rectifies the AC power to the DC power and corrects the power factor by making an AC component of a DC current close to a sine wave.

The current sensor 214 detects an output current from the PFC circuit 213 and outputs the detection value to the ECU 100.

The capacitor C2 is connected between output nodes of the PFC circuit 213 and smoothes the DC voltage output from the PFC circuit 213.

The voltage sensor 215 is connected between terminals of the capacitor C2. The voltage sensor 215 detects an output voltage VH from the PFC circuit 213 and outputs the detection value to the ECU 100.

The DC-DC converter 220 includes an inverter circuit 221, a transformer TR1, a rectifier circuit 222, a choke coil L3, a current sensor 223, and a capacitor C3. The DC-DC converter 220 converts the output voltage VH from the AC-DC converter 210 to a DC voltage VDC.

The inverter circuit 221 includes switching elements Q5 to Q8. In response to a control signal (in detail, duty of a pulse-width modulation (PWM) signal) from the ECU 100, the switching elements Q5 to Q8 convert the DC power output from the AC-DC converter 210 to the AC power and supply the AC power to a primary winding of the transformer TR1.

The transformer TR1 converts the AC voltage from the inverter circuit 221 to the AC voltage having a voltage value corresponding to a winding ratio between the primary winding and secondary winding.

The rectifier circuit 222 includes diodes D1 to D4. A diode bridge is formed by the diodes D to D4. The diodes D1 to D4 rectify the AC power from the secondary winding of the transformer TR1, that is, convert the AC power to the DC power.

The choke coil L3 and the capacitor C3 are connected in series to each other between output nodes of the rectifier circuit 222. The choke coil L3 and the capacitor C3 constitute an LC filter and eliminate a ripple component that is contained in the DC current output from the rectifier circuit 222 and is generated by the switching operations of the switching elements Q5 to Q8.

The current sensor 223 detects the current flowing through the choke coil L3 and outputs the detection value to the ECU 100.

The output circuit 230 includes a diode D5, a relay RY4, and a voltage sensor 231. The output circuit 230 outputs the DC voltage VDC from the DC-DC converter 220 to the battery 10.

The diode D5 prevents a backflow of the current. In the positive-side power line, the diode D5 is connected such that a direction from the DC-DC converter 220 to the relay RY4 is a forward direction.

The relay RY4 is connected between the DC-DC converter 220 and an output terminal of the electric power converter 200. The relay RY4 allows and interrupts the supply of electric power from the electric power converter 200 to the outside of the electric power converter 200.

The voltage sensor 231 is connected between the output terminals of the electric power converter 200. The voltage sensor 231 detects the DC voltage VDC output from the electric power converter 200 and outputs the detection value to the ECU 100.

In the external charging control, the ECU 100 controls each of the circuits in the electric power converter 200 such that the electric power corresponding to command electric power (i.e., command power) P is supplied from the system power supply 900. More specifically, the ECU 100 sets target electric power (i.e., target power) TAG, and changes the command electric power P for the electric power converter 200 toward the target electric power TAG. The target electric power TAG is set to be equal to or lower than lower one of upper limit electric power that can be supplied from the system power supply 900 and upper limit electric power that the battery 10 can receive. For example, the upper limit electric power that can be supplied from the system power supply 900 is calculated with the use of the voltage (for example, AC 200 V) of the system power supply 900 and a rated current (known value) of the charge cable 800. A manner in which the command electric power P is changed will be described below in detail.

FIG. 1 and FIG. 2 show the configuration example in which the ECU 100, which controls the entire vehicle 1, also controls the electric power converter 200. However, the ECU 100 may be appropriately divided into a plurality of ECUs, or a dedicated ECU (charge ECU) that controls the electric power converter 200 may be provided.

In the vehicle 1 that is configured as described so far, the electric power supplied from the system power supply 900 can be regulated (adjusted) by controlling the command electric power P for the electric power converter 200. The external charging control in this embodiment has a feature that the electric power supplied from the system power supply 900 is appropriately regulated on the basis of the command electric power P. Hereinafter, in order to clarify the feature of the external charging control in this embodiment, a description will be initially provided on the external charging control in a comparative example.

In many periods during the external charging control, the ECU 100 maintains the command electric power P such that the command electric power P is constant, so as to charge the battery 10 with the constant electric power. For this reason, the ECU 100 manages a control flag CP that is used to control initiation/termination of charging with the constant electric power (constant power (CP) charging). During the CP charging of the battery 10 (and before the CP charging), the control flag CP is basically set at 0 (CP=0 (OFF)). When the CP charging of the battery 10 is interrupted to change the command electric power P, the control flag CP is set at 1 (CP=1 (ON)).

Figure 3:
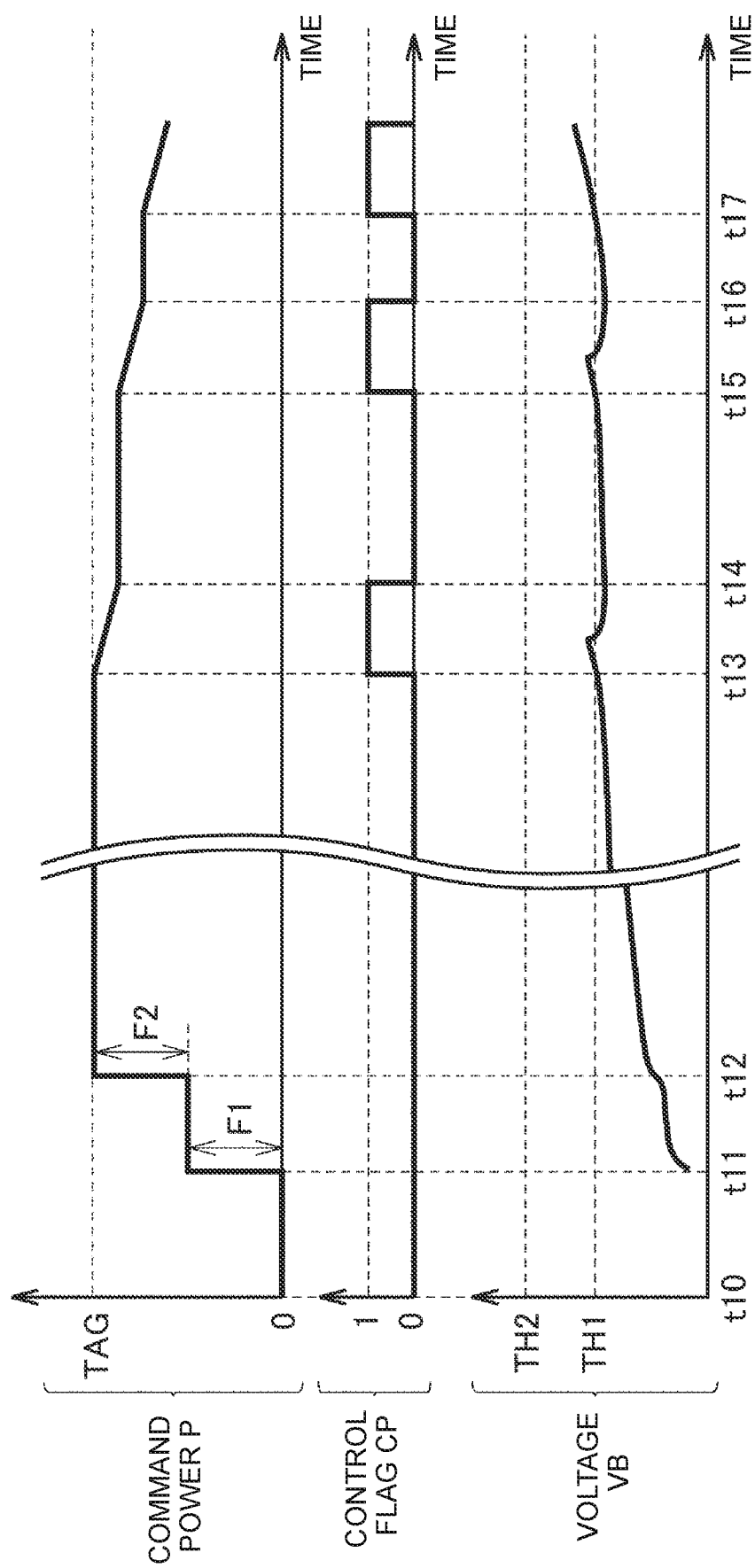
FIG. 3 is a time chart of external charging control in a comparative example.

FIG. 3 is a time chart of the external charging control in the comparative example. In each of FIG. 3 and FIG. 4 to FIG. 6, which will be described below, a horizontal axis represents an elapsed time. A vertical axis represents the command electric power P, the control flag CP, and the voltage VB of the battery 10 in the stated order from an upper side. The target electric power TAG, which has been described above, is set for the command electric power P. In addition, a flag threshold TH1 and a full-charge threshold TH2, which will be described below, are set for the voltage VB of the battery 10 in advance.

With reference to FIG. 3, at time t10, the command electric power P is set at 0, and the charging of the battery 10 has not been initiated. The control flag CP is set at 0 (CP=0).

At time t11, the charging of the battery 10 is initiated. The command electric power P is increased from 0 by F1, and thus, the voltage VB of the battery 10 starts to be boosted. In the following description, an increased amount of the command electric power P (i.e., an amount by which the command electric power P is increased) and a reduced amount of the command electric power P (i.e., an amount by which the command electric power P is reduced) will be also collectively described as "change amount ΔP" of the command electric power P. In the example shown in FIG. 3, the change amount ΔP is set at F1 (ΔP=F).

In the case where the change amount ΔP is excessively large, an increase in the command electric power P may exert a negative influence on another electrical device (for example, a lighting device although not shown) connected to the system power supply 900. For example, a flicker may be caused in the other electrical device connected to the system power supply 900 due to the increase in the command electric power P. Thus, F1 is set in advance to a value smaller than the amount of change in the electric power that causes the flicker in the system power supply 900 (in other words, the amount of change in the electric power that causes the flicker in the other electric device connected to the system power supply 900) at the initiation of the supply of electric power from the system power supply 900 to the vehicle 1. As one example, F1 is 1,650 W when the system power supply 900 is an AC 200 V system.

After a specified period (for example, 1.2 seconds) elapses from the time t11, at time t12, the command electric power P is increased by F2 and reaches the target electric power TAG. Due to this increase, the voltage VB of the battery 10 is further boosted. As well as F1, F2 is a value that is smaller than the amount of change in the electric power, which causes the flicker in the system power supply 900. Further, F2 is a value that corresponds to a power difference (=TAG−F1) between the target electric power TAG and the electric power (F1) before the increase.

FIG. 3 shows the example in which the command electric power P is increased in two steps from 0 and reaches the target electric power TAG. However, the number of times that the command electric power P is increased is not limited to twice, and may be three times or more depending on the target electric power TAG. For example, when the command electric power P is increased three times, the change amount ΔP becomes F1, F1, and F2 in the stated order.

Thereafter, as the charging of the battery 10 progresses, the voltage VB is gradually increased and reaches the flag threshold TH1 at time t13. Accordingly, the control flag CP is switched from 0 to 1 (from CP=0 to CP=1). As a result, the command electric power P is reduced linearly. Note that the manner in which the command electric power P is reduced is not limited to the manner in which the command electric power P is reduced linearly. The command electric power P may be reduced in a non-linear manner (for example, in a curved manner). The control flag CP is maintained at 1 (CP=1) for a predetermined short period (for example, less than one second), and then is switched to 0 (CP=0) again (time t14). Thus, the CP charging is restarted.

The voltage VB as the detection value of the voltage sensor 1 is a value that is acquired by adding an overvoltage of the battery 10 to an open-circuit voltage (OCV) of the battery 10. The overvoltage is expressed by a product (IB×R) of the charge current IB for the battery 10 and internal resistance R of the battery 10. Accordingly, when the command electric power P is reduced, the charge current IB is reduced, and the overvoltage is thereby reduced. Thus, the voltage VB at the restart of the CP charging (the time t14) is lower than the flag threshold TH 1 due to a reduction in the overvoltage.

Thereafter, the CP charging continues, and the voltage VB reaches the flag threshold TH1 again at time t15. At the time, as is the case with the control executed in the period from the time t13 to the time t14, the control flag CP is switched, and the command electric power P is reduced. As a result, the voltage VB becomes lower than the flag threshold TH1. Thereafter, the charging of the battery 10 can be continued by appropriately reducing the command electric power P in the same manner as the manner described above, although the detailed description will not be repeated.

There is a case where a cylindrical cell is adopted for the in-vehicle battery. For example, an 18650 size cylindrical cell has higher internal resistance than that of a typical rectangular prism cell. In addition, because this cylindrical cell is smaller in size and capacity than the rectangular prism cell, the number of the cylindrical cells used in the battery (the number of the cylindrical cells included in the battery) is increased. Thus, when the battery 10 is configured to include the cylindrical cells, the internal resistance of the battery 10 is relatively increased. In general, an electric power storage device such as a secondary battery or a capacitor exhibits temperature dependency, that is, the internal resistance of the electric power storage device is increased as a temperature is lowered. Thus, the internal resistance of the battery 10 can be high in low-temperature environment at, for example, a temperature below zero degrees in Celsius. In the case where the external charging control as in the comparative example (see FIG. 3) is executed for the battery 10 having such high resistance, the following problems may occur.

Figure 4:
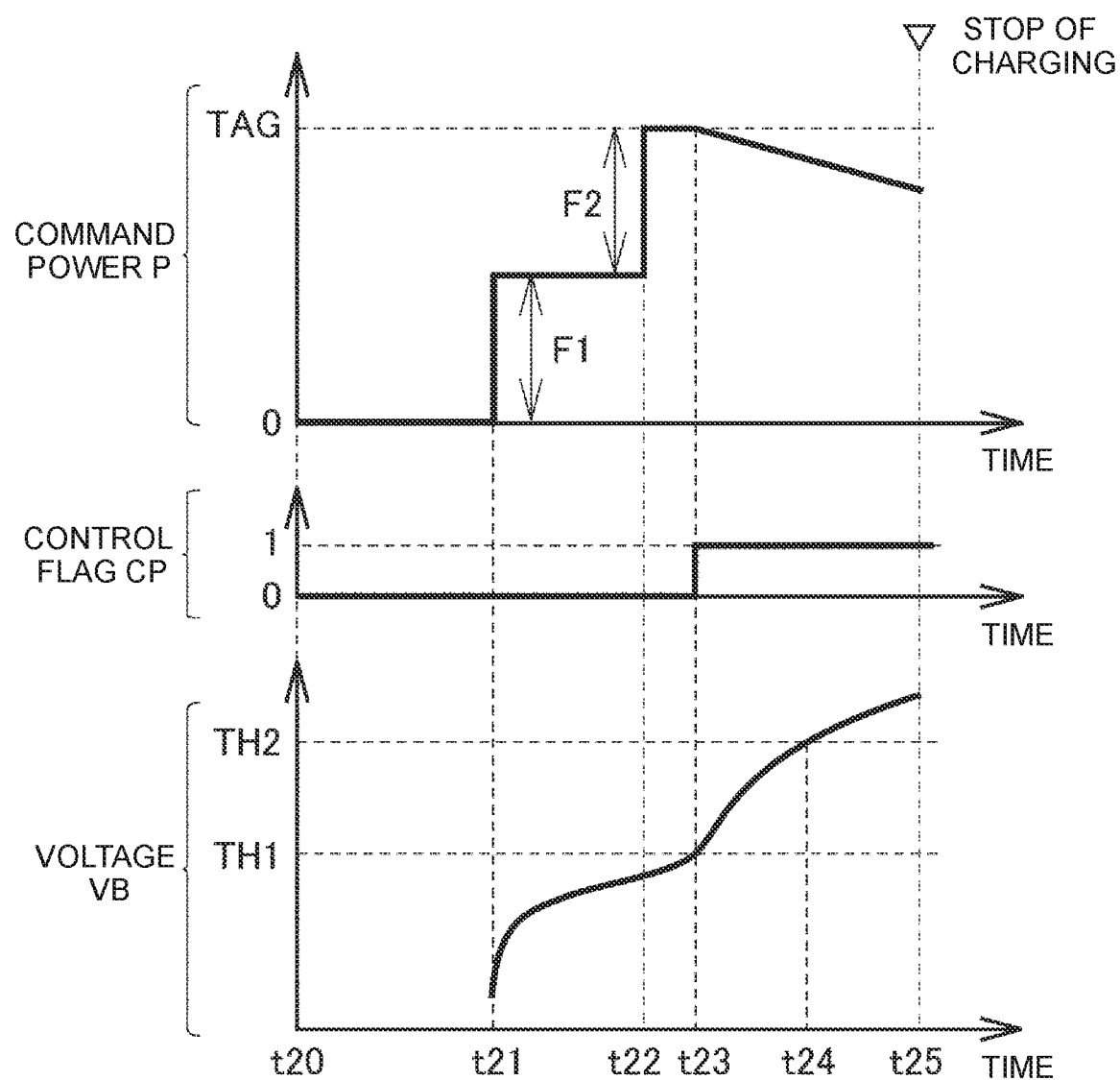
FIG. 4 is a time chart for illustrating problems of the external charging control in the comparative example.

FIG. 4 is a time chart for illustrating the problems of the external charging control in the comparative example. With reference to FIG. 4, at time t20, the command electric power P is set at 0, and the control flag CP is set at 0 (CP=0), as is the case with the time t10 in FIG. 3.

At time t21, the command electric power P is increased from 0 by F1. Due to the increase, the charging of the battery 10 is initiated, and the voltage VB of the battery 10 starts to be boosted. As described above, an increased amount of the voltage VB is equal to the value that is acquired by adding the overvoltage (=IB×R) to an increased amount of the OCV, that is, an amount by which the OCV is increased due to a progress in the charging of the battery 10. Thus, when the internal resistance R of the battery 10 is relatively high, the overvoltage thereof also becomes high. As a result, an increase rate (the increased amount per unit time) of the voltage VB is increased.

When a specified period elapses from the time t21, the command electric power P is further increased from F1 by F2 and reaches the target electric power TAG (time t22). Due to this increase, the voltage VB of the battery 10 is further boosted and becomes equal to or higher than the flag threshold TH1. Accordingly, the control flag CP is switched from 0 to 1 (from CP=0 to CP=1) (time t23). As a result, the command electric power P starts to be reduced linearly.

Because the internal resistance R of the battery 10 is relatively high, the overvoltage thereof is likely to be increased. Accordingly, for example, in the case where the current IB is increased due to the increase in the command electric power P (for example, in the case where slight overshoot of the current IB occurs), the overvoltage is excessively increased, which may cause the voltage VB to reach the full-charge threshold TH2. Alternatively, before the overvoltage is reduced due to the linear reduction in the command electric power P, the voltage VB may reach the full-charge threshold TH2 due to the high increase rate of the voltage VB (time t24). As a result, although the battery 10 is actually not in a full-charge state, the charging of the battery 10 is stopped (time t25).

Thus, in the external charging control of the comparative example, in the case where the internal resistance R of the battery 10 is relatively high, the voltage VB reaches the full-charge threshold TH2 before the voltage VB is returned to a value equal to or lower than the flag threshold TH1 by reducing the command electric power P after the command electric power P is increased to the target electric power TAG. As a result, there is a possibility that the charging of the battery 10 cannot be continued until the battery 10 is brought to the full-charge state (or a nearly full-charge state).

In view of the above, this embodiment adopts a configuration in which the change amount ΔP of the command electric power P is set to G1 that is a value smaller than F1 set for a purpose of preventing occurrence of the flicker in the system power supply 900. Hereinafter, a description will be provided on a method of setting the change amount ΔP in this embodiment.

Figure 5:
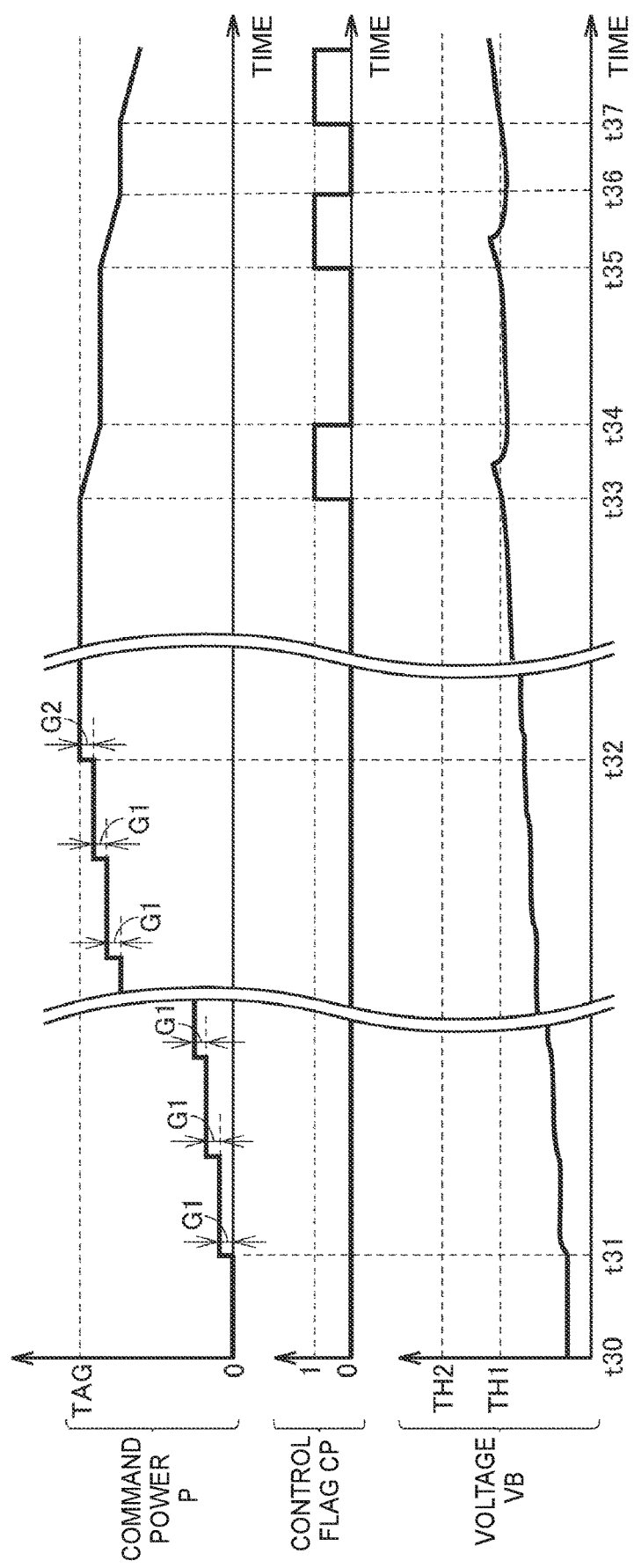
FIG. 5 is a time chart of external charging control in the first embodiment.

FIG. 5 is a time chart of the external charging control in the first embodiment. With reference to FIG. 5, in the first embodiment, from time t31 onward, the command electric power P is increased by G1 each time the specified period (for example, 1.2 seconds) elapses. This change amount ΔP=G1 is a value sufficiently smaller than the change amount ΔP=F1 in the comparative example (1,650 W in the case where the system power supply 900 is the AC 200 V system). This change amount ΔP=G1 is 100 W, for example. G1 may be regarded as the "reference amount" in the present disclosure.

Thereafter, at time t32, the command electric power P is lastly increased by G2 and reaches the target electric power TAG. G2 is a value that corresponds to a remainder immediately before the command electric power P, which has been increased stepwise by G1, reaches the target electric power TAG. In other words, G2 is a value that corresponds to a so-called fraction and is equal to or smaller than G1.

Thus, the change amount ΔP=G1 of the command electric power P is set to be sufficiently smaller than the change amount ΔP=F1 in the comparative example. More specifically, G1 is set such that the increased amount of the voltage VB at each step of increasing the command electric power P is smaller than a voltage difference (=TH2−TH1) between the full-charge threshold TH2 and the flag threshold TH1.

Due to the relatively small change amount ΔP=G1 of the command electric power P, when the command electric power P is increased, the current IB is unlikely to be rapidly increased (in other words, the overshoot of the current IB is unlikely to occur). Thus, the excessive increase in the overvoltage is prevented.

Figure 6:
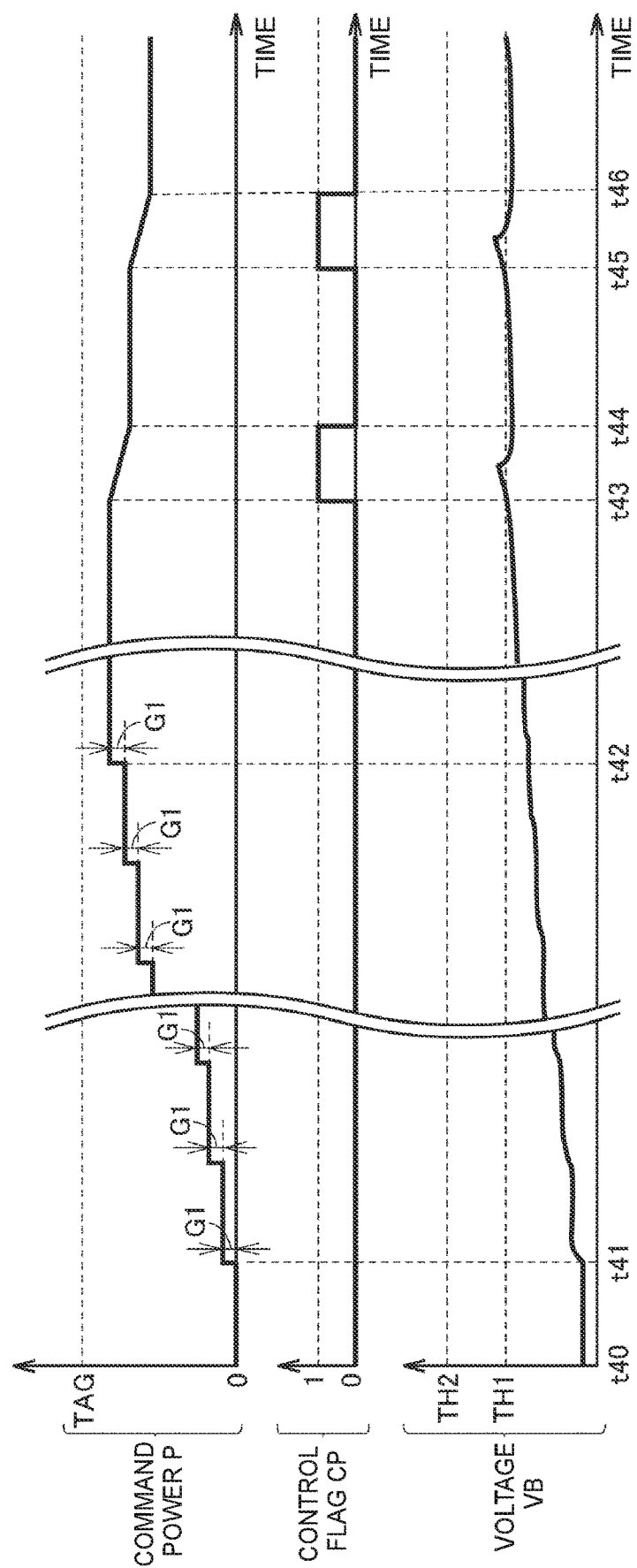
FIG. 6 is a time chart of another example of the external charging control in the first embodiment.

FIG. 6 is a time chart of another example of the external charging control in the first embodiment. As shown in FIG. 6, there is a case where the voltage VB becomes equal to or higher than the flag threshold TH1 before the command electric power P reaches the target electric power TAG (see time t43). In this case, the control flag CP is switched from 0 to 1 (from CP=0 to CP=1), and the command electric power P is reduced. As a result, the voltage VB is prevented from reaching the full-charge threshold TH2.

Figure 7:
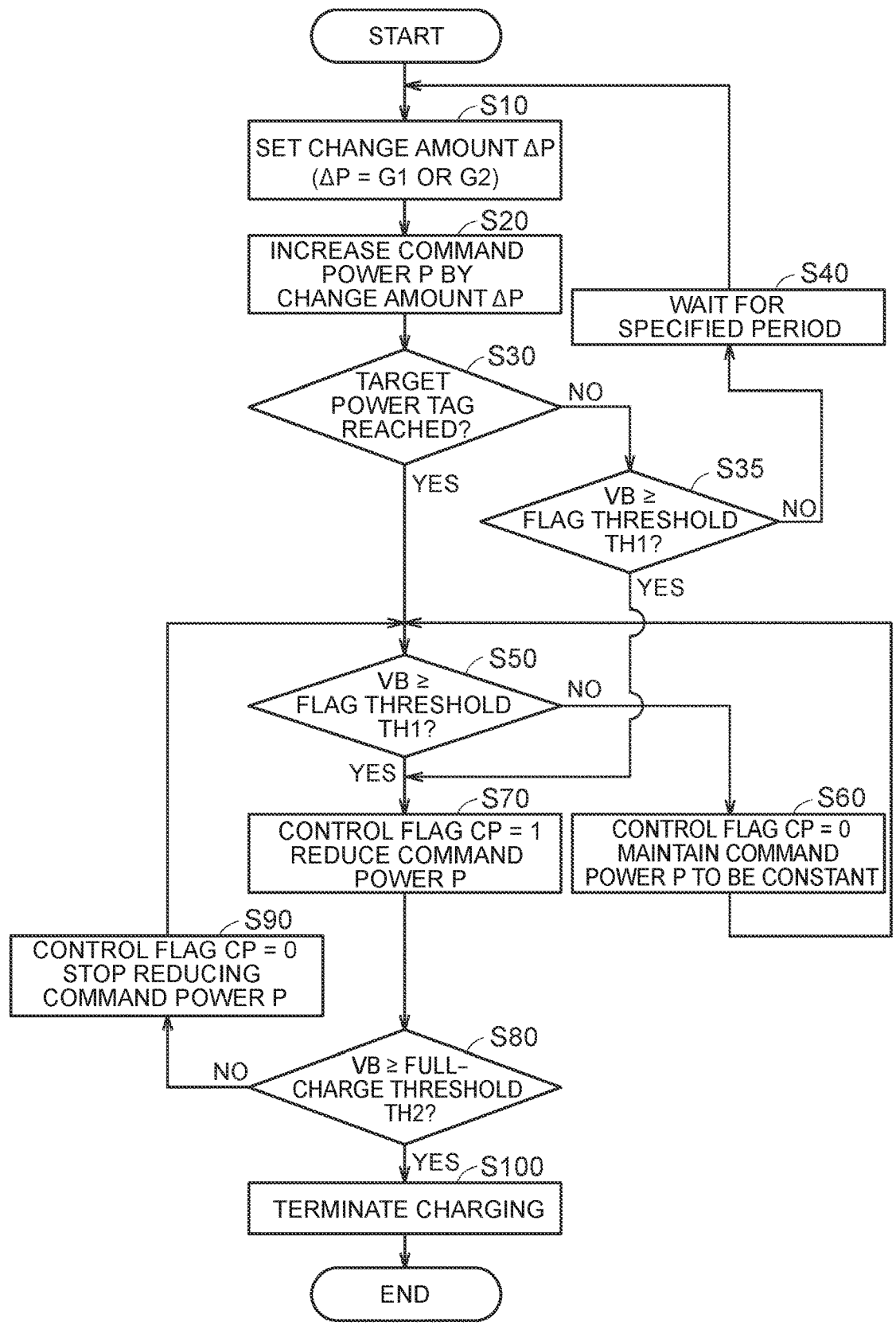
FIG. 7 is a flowchart for illustrating a method of setting an increase amount by which command electric power is increased in the first embodiment.

FIG. 7 is a flowchart of the external charging control in the first embodiment. This flowchart is called from a main routine (not shown) and executed when the charging is initiated in a state where the charge cable 800 is connected to the inlet 90, for example. Note that each step (hereinafter abbreviated as "S") of the flowcharts shown in FIG. 7 and FIG. 11, which will be described below, is basically realized by software processing executed by the ECU 100, and may be realized by dedicated hardware (an electric circuit) provided in the ECU 100.

With reference to FIG. 5 to FIG. 7, in S10, the ECU 100 sets the change amount ΔP of the command electric power P to G1. As has already been described, G1 is the value (for example, 0.1 kW, that is, 100 W) that is set such that, even when the command electric power P is increased stepwise by G1, the increased amount of the voltage VB is smaller than the voltage difference (=TH2−TH1) between the full-charge threshold TH2 and the flag threshold TH1.

In S20, the ECU 100 increases the command electric power P by G1 (see the time t31). Then, the ECU 100 determines whether the increased command electric power P has reached the target electric power TAG (S30). If the command electric power P has not reached the target electric power TAG (NO in 830), the ECU 100 further determines whether the voltage VB is equal to or higher than the flag threshold TH1 (S35). If the command electric power P has not reached the target electric power TAG and the voltage VB is lower than the flag threshold TH1 (NO in S30 and No in S35), the ECU 100 waits for the specified period (for example, 1.2 seconds) (S40), the processing returns to S10, and the ECU 100 further increases the command electric power P by G1. In the case where the processing in S10 to S40 is repeatedly executed, the command electric power P is increased stepwise. Note that the change amount ΔP immediately before the command electric power P reaches the target electric power TAG is set to G2, which is smaller than G1 (see the time t32).

When the command electric power P reaches the target electric power TAG (YES in S30), the processing proceeds to S50, and the ECU 100 determines whether the voltage VB of the battery 10 is equal to or higher than the flag threshold TH1. If the voltage VB is lower than the flag threshold TH1 (NO in S50), the ECU 100 sets the control flag CP at 0 (CP=0) and maintains the command electric power P such that the command electric power P is constant (S60).

If the voltage VB is equal to or higher than the flag threshold TH1 (YES in S50), the ECU 100 switches the control flag CP from 0 to 1 (from CP=0 to CP=1) and reduces the command electric power P linearly, for example (S70, see the time t33).

Note that, if the command electric power P has not reached the target electric power TAG and the voltage VB is equal to or higher than the flag threshold TH1 (NO in S30 and YES in S35), the processing proceeds to S70, and the ECU 100 switches the control flag CP from 0 to 1 (from CP=0 to CP=1) and reduces the command electric power P (see the time t43).

In 880, the ECU 100 determines whether the voltage VB is equal to or higher than the full-charge threshold TH12. If the voltage VB is lower than the full-charge threshold TH2 (NO in 880), the ECU 100 returns the control flag CP from 1 to 0 (from CP=1 to CP=0) after a lapse of the specified period and stops the reduction in the command electric power P (S90, see the time t34). Thereafter, when the voltage VB becomes equal to or higher than the full-charge threshold TH2 (YES in S80), the ECU 100 stops a power converting operation of the electric power converter 200 and terminates the charging of the battery 10 (S100).

As has been described so far, according to the first embodiment, the change amount ΔP of the command electric power P is set to G1 that is a value sufficiently smaller than the value (F1) set for the purpose of preventing occurrence of the flicker in the system power supply 900. This G1 is set such that, even when the command electric power P is increased by G1, the voltage VB does not reach the full-charge threshold TH2 from the flag threshold TH1. Accordingly, the battery 10 is prevented from reaching the full-charge state along with the increase in the command electric power P. As a result, it is possible to realize the control that returns the voltage VB to a value equal to or lower than the flag threshold TH1, and gradually reduces the command electric power P each time the voltage VB reaches the flag threshold TH1. Therefore, the battery 10 can be charged until the battery 10 is brought to a nearly full-charge state that is close to the full-charge state.

Here, the full-charge state of the battery 10 is a state where the charging of the battery 10 is considered to be completed and thus is stopped, and includes a state where the SOC of the battery 10 is 100%. However, the full-charge state of the battery 10 is not limited thereto. In general, the deterioration of the secondary battery is likely to progress in the case where the secondary battery in the full-charge state remains unused for a long period. Accordingly, the full-charge state of the battery 10 may include a state where the SOC is lower than 100%. In addition, there is a case where the full-charge threshold TH2 is set to a value lower than the voltage corresponding to the SOC=100%.

A second embodiment will be described. As has been described in the first embodiment, when the change amount ΔP of the command electric power P is set to G1 that is the sufficiently small value, the battery 10 can be charged to the nearly full-charge state. In the case where the change amount ΔP=G1 is set, the charging electric power with which the battery 10 is charged is reduced, and therefore, a charging period during which the battery 10 is charged may be increased, as compared to the case where the change amount ΔP=F1 is set.

In detail, in the case where the change amount ΔP=F1 is set, the command electric power P reaches the target electric power TAG after the command electric power P is increased several times (see FIG. 3). In contrast, in the case where the change amount ΔP=G1 is set, the command electric power P may be required to be increased several tens of times until the command electric power P reaches the target electric power TAG (see FIG. 5). In such a case, when the wait period at each of the steps (see S40 in FIG. 7) is 1.2 seconds, it takes several tens of seconds to several minutes for the command electric power P to reach the target electric power TAG. Thus, the charging period is extended. In the second embodiment, a description will be provided on a configuration in which an increase in the charging period is prevented while the battery 10 can be charged until the battery 10 is brought to the nearly full-charge state. Note that a configuration of a vehicle according to the second embodiment is the same as the configuration of the vehicle 1 according to the first embodiment, and thus the description thereof will not be provided.

Figure 8:
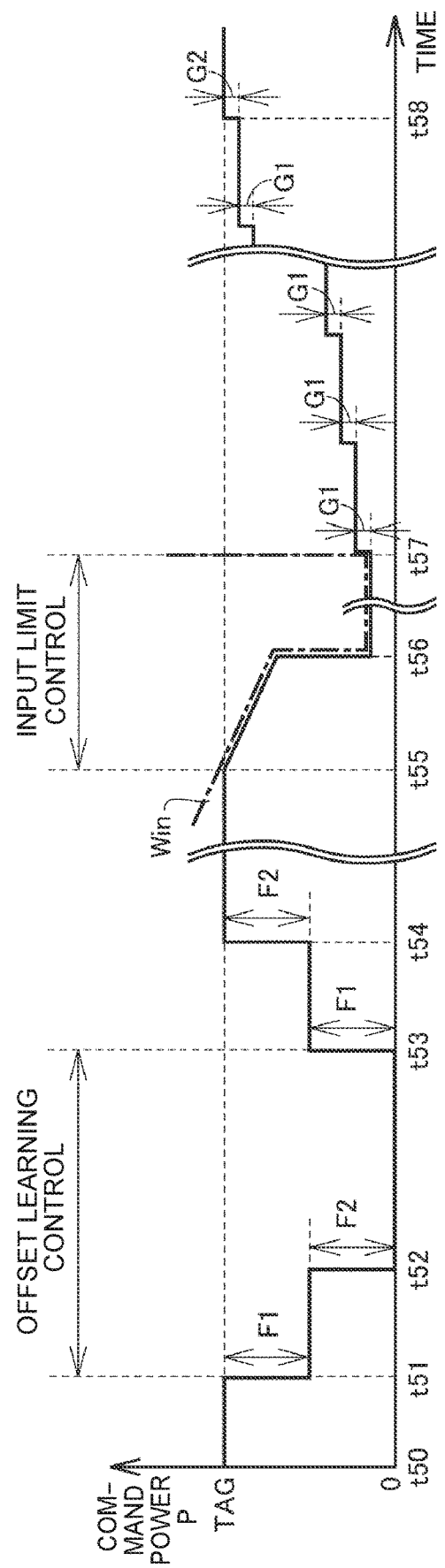
FIG. 8 is a time chart of external charging control in the second embodiment.
Figure 10:
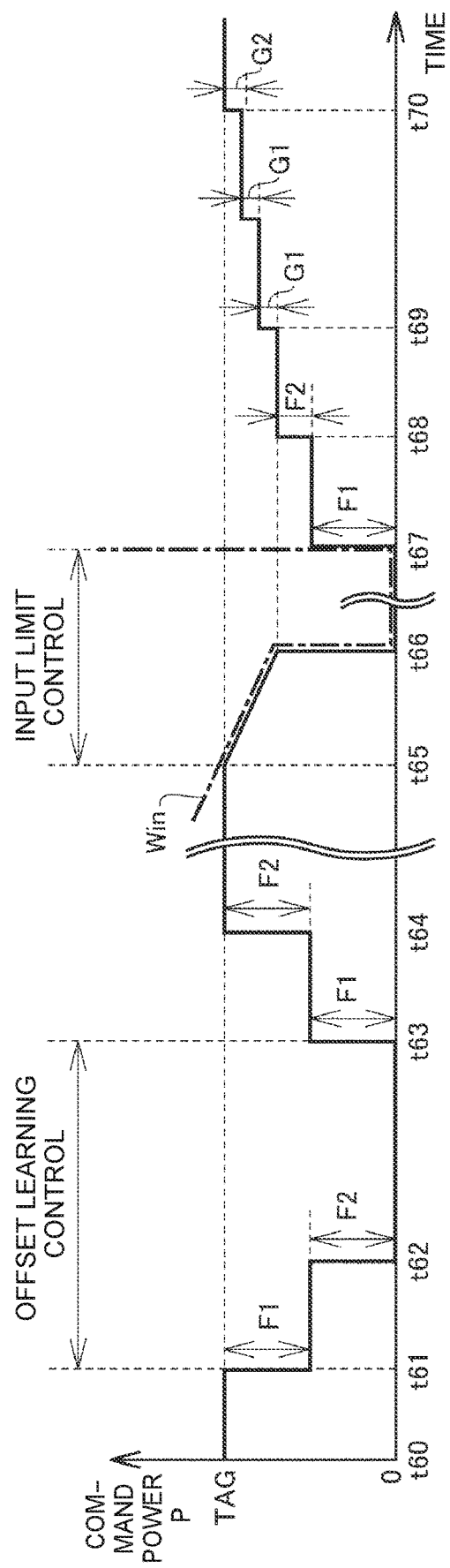
FIG. 10 is a time chart of external charging control in a modified example of the second embodiment.

FIG. 8 is a time chart of external charging control in the second embodiment. In each of FIG. 8 and FIG. 10, which will be described below, a horizontal axis represents the elapsed time, and a vertical axis represents the command electric power P. Each of FIG. 8 and FIG. 10 shows a situation after the initiation of the supply of electric power from the system power supply 900.

The battery 10 is provided with the current sensor 12, which detects the current IB flowing into and out of the battery 10 (see FIG. 1). In general, the output signal of the current sensor may include an offset component that corresponds to a temperature or the like of the current sensor. Accordingly, in order to improve detection accuracy of the current sensor 12 and thereby estimate the SOC of the battery 10 with a high degree of accuracy, for example, an offset value of the current sensor 12 may be acquired. Thus, as shown in FIG. 8, the ECU 100 executes "offset learning control" in a period from time t51 to time t53.

In detail, the command electric power P that is constant at the target electric power TAG is reduced by F1 at the time t51. Furthermore, at the time t52 at which the specified period has elapsed from the time t51, the command electric power P is reduced by F2 and reaches 0. This state where the command electric power P is 0 (that is, a state where the current is 0) is maintained until the time t53, and the detection value of the current sensor 12 in this period is acquired as the offset value of the current sensor 12. After the offset learning control, the command electric power P is increased by F1 at the time t53, is further increased by F2 at time t54, and is returned to the target electric power TAG. Although not shown in FIG. 8, the offset learning control is periodically executed during the external charging control.

In addition, allowable charging electric power Win is used to protect the battery 10 during the charging of the battery 10, and the allowable charging electric power Win indicates an upper limit control value of the charging electric power for the battery 10. The allowable charging electric power Win may be changed in accordance with the state (the SOC, the temperature TB, or the like) of the battery 10 or usage history of the battery 10, for example. Thus, the command electric power P may be changed in accordance with the change in the allowable charging electric power Win. Hereinafter, control that limits the command electric power P with the use of the allowable charging electric power Win will be also referred to as "input limit control".

During the input limit control from time t55 to time t57, the command electric power P is equal to the allowable charging electric power Win. At the time t55, the input limit control is initiated, and the allowable charging electric power Win is reduced linearly, for example. At the time t56, the allowable charging electric power Win is reduced stepwise, for example. However, in the example shown in FIG. 8, the allowable charging electric power Win does not reach 0 (zero), and remains constant at a value larger than 0 (a positive value) in a period from the time t56 to the time t57. At the time t57, the input limit control is terminated.

In a period from the time t57 to time t58 after the input limit control is executed, the command electric power P is increased by G each time the specified period (for example, 1.2 seconds) elapses as in the first embodiment. Then, at the time t58, the command electric power P is increased by G2 and reaches the target electric power TAG.

In the overall control shown in FIG. 8, there are two opportunities to increase the command electric power P. The first opportunity is the period after the offset learning control (see the time t53 to t54), and the second opportunity is the period after the input limit control (see the time t57 to t58). It is conceivable to set the change amount ΔP of the command electric power P to G1 in both of these opportunities. However, in the example shown in FIG. 8, the change amount ΔP after the offset learning control is set to F1. A reason why the change amount ΔP after the offset learning control is set to F1 will be described.

Before the offset learning control is executed, the battery 10 has not been brought to the full-charge state. In addition, in the offset learning control, the command electric power P is reduced to 0 (zero). Thus, while the battery 10 is slightly charged in a period after the command electric power P is reduced in the one step and until the command electric power P reaches 0 (the period from the time t51 to t52), the charging electric power for the battery 10 during the offset learning control can be regarded as approximately 0. Accordingly, the OCV before the offset learning control is substantially equal to the OCV after the offset learning control.

Furthermore, a reduced amount of the voltage (an amount by which the voltage is reduced) at the time when the command electric power P is reduced by F2 (the time t52) is substantially equal to an increased amount of the voltage (an amount by which the voltage is increased) at the time when the command electric power P is increased by F1 (the time t53). This is because the internal resistance of the battery 10 remains constant before and after the offset learning control, and F1 is approximately equal to F2 (F1≈F2), and therefore, a reduced amount of the current (i.e., an amount by which the current is reduced) at the time t52 is substantially equal to an increased amount of the current (i.e., an amount by which the current is increased) at the time t53.

Thus, the OCV and the amount of change in the voltage before the offset learning control are substantially equal to the OCV and the amount of change in the voltage after the offset learning control. Accordingly, in the case where the voltage VB does not reach the threshold voltage (full-charge threshold) TH2 before the execution of the offset learning control (the time t52), the voltage VB does not reach the threshold voltage TH2 after the execution of the offset learning control (the time t53). Thus, after the offset learning control is executed, the change amount ΔP can be set to F1. In this way, as compared to the case where the change amount ΔP=G1 is set after the offset learning control, the charging period can be reduced.

During the input limit control, the command electric power P is maintained at the positive value, the charging of the battery 10 progresses, and the OCV is increased. Thus, in the case where the increased amount of the voltage at the time of increasing the command electric power P after the input limit control is large (i.e., in the case where ΔP=F1), the voltage VB may reach the threshold voltage TH2. For this reason, after the input limit control is executed, the change amount ΔP=G1 is set, as in the first embodiment.

Note that the control that increases the command electric power P after the input limit control may be regarded as the "first increase control" according to the present disclosure, and the control that increases the command electric power P after the offset learning control may be regarded as "second increase control" according to the present disclosure.

Figure 9:
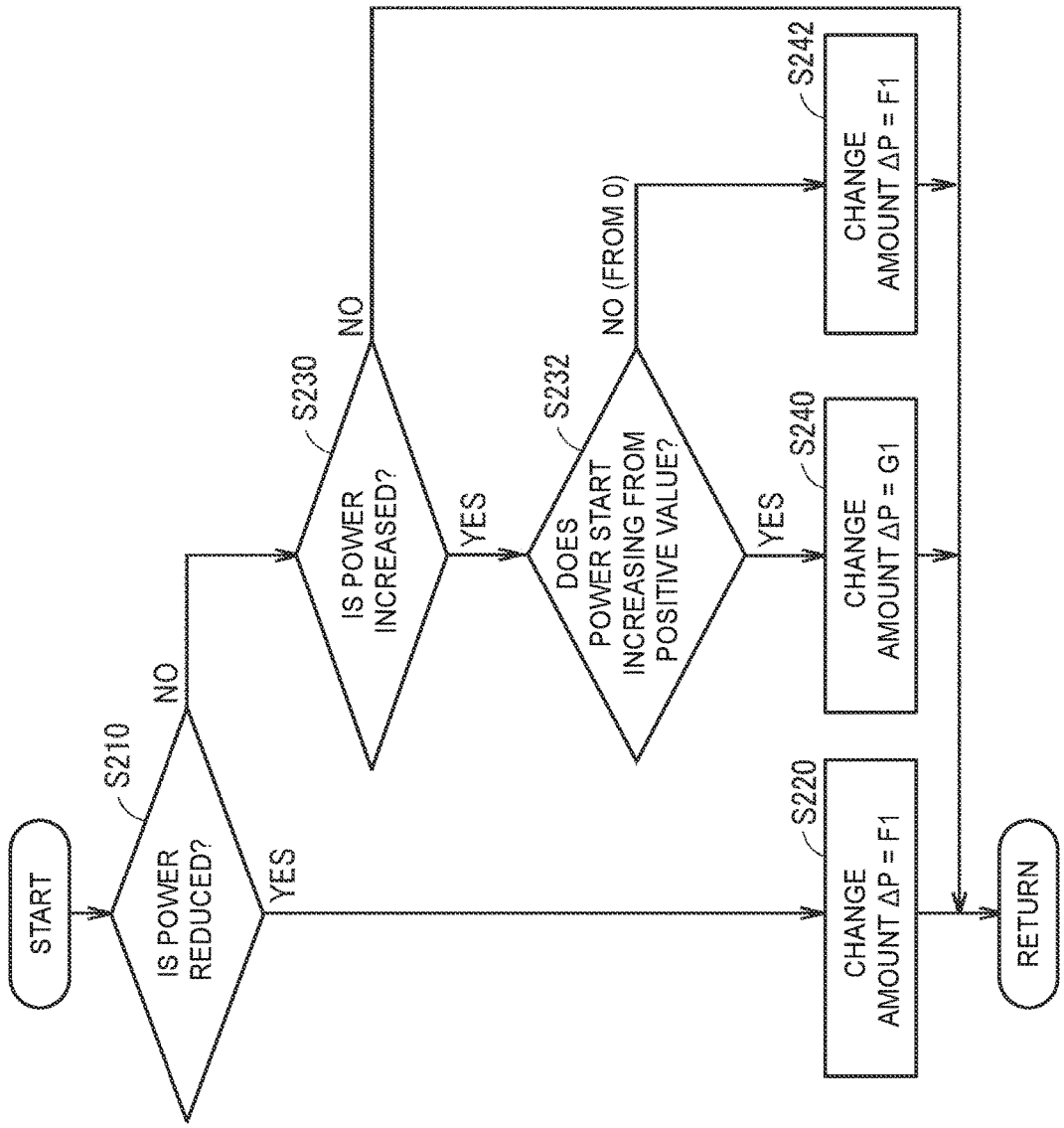
FIG. 9 is a flowchart for illustrating a method of setting a change amount by which command electric power is changed in the second embodiment.

FIG. 9 is a flowchart for illustrating processing of setting the change amount ΔP of the command electric power P in the second embodiment. This flowchart is called from the main routine (not shown) and repeatedly executed, for example, at specified time intervals during the external charging control.

With reference to FIG. 8 and FIG. 9, in S210, the ECU 100 determines whether the control for the command electric power P that is executed in another unillustrated routine is the control that reduces the command electric power P stepwise. If the command electric power P is reduced stepwise as in the offset learning control (YES in S210), the change amount ΔP is set to F1 (or F2) (S220, see the time t51 and t52).

If the control for the command electric power P is not the control that reduces the command electric power P stepwise (NO in S210), the ECU 100 determines whether the control for the command electric power P is the control that increases the command electric power P stepwise (S230). If the command electric power P is increased stepwise (YES in S230), the ECU 100 further determines whether the command electric power P starts to be increased from the positive value (S232).

If the command electric power P starts to be increased from 0 (NO in S232), that is, if the command electric power P is set at 0 and then is increased as in the offset learning control, the change amount ΔP is set to F (or F2) (S242, see the time t53 and t54).

On the other hand, if the command electric power P starts to be increased from the positive value (YES in S232), that is, if the command electric power P is reduced such that the command electric power P does not reach 0 and then is increased as in the input limit control shown in FIG. 8, the change amount ΔP is set to G1 (or G2) (S240, see the time t57 to t58).

Note that, if the control for the command electric power P is neither the control that reduces the command electric power P stepwise nor the control that increases the command electric power P stepwise and is the control that reduces the command electric power linearly, for example (NO in S230), the change amount ΔP is not set, and the processing returns to the main routine. In addition, in the case where high priority is given to the protection of the battery 10 by the input limit control over a measure against the flicker, the negative determination is made in S230.

As has been described so far, according to the second embodiment, the change amount ΔP set in the case where the command electric power P is increased stepwise from the command electric power P=0 is different from the change amount ΔP set in the case where the command electric power P is increased stepwise from the command electric power P>0. In the case where the command electric power P is increased stepwise from the command electric power P>0 (after the execution of the input limit control in the example shown in FIG. 8), the change amount ΔP=G1 is set, and thus the battery 10 can be charged until the battery 10 is brought to the nearly full-charge state. On the other hand, in the case where the command electric power P is increased stepwise from P=0 (after the execution of the offset learning control in the example shown in FIG. 8), the change amount ΔP=F1 is set. In this way, as compared to the case where the change amount ΔP is set to G1, the charging period for the battery 10 is reduced. Thus, by using the different values of the change amount ΔP depending on the cases, the charging period for the battery 10 can be reduced while the battery 10 can be charged until the battery 10 is brought to the nearly full-charge state.

A modified example of the second embodiment will be described. In the second embodiment, the reduction in the allowable charging electric power Win is stopped at the time point at which Win is larger than 0 (Win>0) during the input limit control. In this case, the command electric power P is also reduced to the positive value (see the time t56 in FIG. 8). Depending on the state or the usage history of the battery 10, there is a case where the charging of the battery 10 is prohibited and the allowable charging electric power Win reaches 0 (Win=0). In this case, the command electric power P also reaches 0 (P=0). In the modified example of the second embodiment, a description will be provided on the case where the charging of the battery 10 is restarted after the command electric power P is reduced to 0 (the command electric power P=0).

FIG. 10 is a time chart of external charging control in the modified example of the second embodiment. This time chart is compared to the time chart in the second embodiment (see FIG. 8). With reference to FIG. 10, control that is executed until time t65 is the same as the control that is executed until the time t55 in the time chart of the second embodiment, and thus the description thereof will not be provided.

At time t66, the allowable charging electric power Win is reduced to 0, and accordingly, the command electric power P is also set at 0. In a period from the time t66 to time t67, the state where the command electric power P is 0 (P=0) is maintained.

At the time t67, the command electric power P is increased from 0 by F1. At time t68, the command electric power P is further increased from F1 by F2 and is returned to the value of the command electric power P set immediately before the reduction to 0 (in other words, the command electric power P is returned to the value set immediately before the reduction to 0). After the command electric power P is returned to the value set immediately before the reduction, from time t69 onward, the command electric power P is increased by G1 each time the specified period (for example, 1.2 seconds) elapses. At time t70, the command electric power P is increased by G2 and reaches the target electric power TAG.

While the command electric power P is maintained at 0 (in a period from the time t66 to the time t67), the charging electric power for the battery 10 is 0. Accordingly, in the case where the battery 10 is not in the full-charge state at the time when the command electric power P is reduced to 0 (at the time t66), the battery 10 is not in the full-charge state at the initiation of the increase in the command electric power P from 0 (at the time t67). Meanwhile, the OCV remains constant while the command electric power P is maintained at 0. In addition, even in the case where the increased amount of the voltage at the initiation of the increase in the command electric power P from 0 (at the time t67) is relatively large and the change amount ΔP of the command electric power P is F1, the increased amount of the voltage at the time is substantially equal to the reduced amount of the voltage at the time when the command electric power P is reduced to 0 (at the time t66). Accordingly, in the case where the voltage VB does not reach the threshold voltage TH2 before the reduction in the command electric power P to 0, the voltage VB does not reach the threshold voltage TH2 at the initiation of the increase in the command electric power P. Thus, in the period from the initiation of the increase in the command electric power P from 0 to the time at which the command electric power P is returned to the value set before the reduction to 0, the change amount ΔP can be set to F1 (or F2). Thus, occurrence of the flicker in the system power supply 900 is prevented, and the charging period can be reduced as compared to the case where the command electric power P is increased stepwise by G1 from the initiation of the increase in the command electric power P.

The OCV of the battery 10 is boosted due to the charging in which the change amount ΔP is set to F1 or F2 (the charging from the time t67 to the time t69). Therefore, after the command electric power P reaches the value set before the reduction to 0 (i.e., from the time t69 onward), the OCV may reach the threshold voltage TH2 if the increased amount of the voltage is large. Thus, the command electric power P is increased by G1. In this way, as in the first and second embodiments, the battery 10 can be charged until the battery 10 is brought to the nearly full-charge state.

Figure 11:
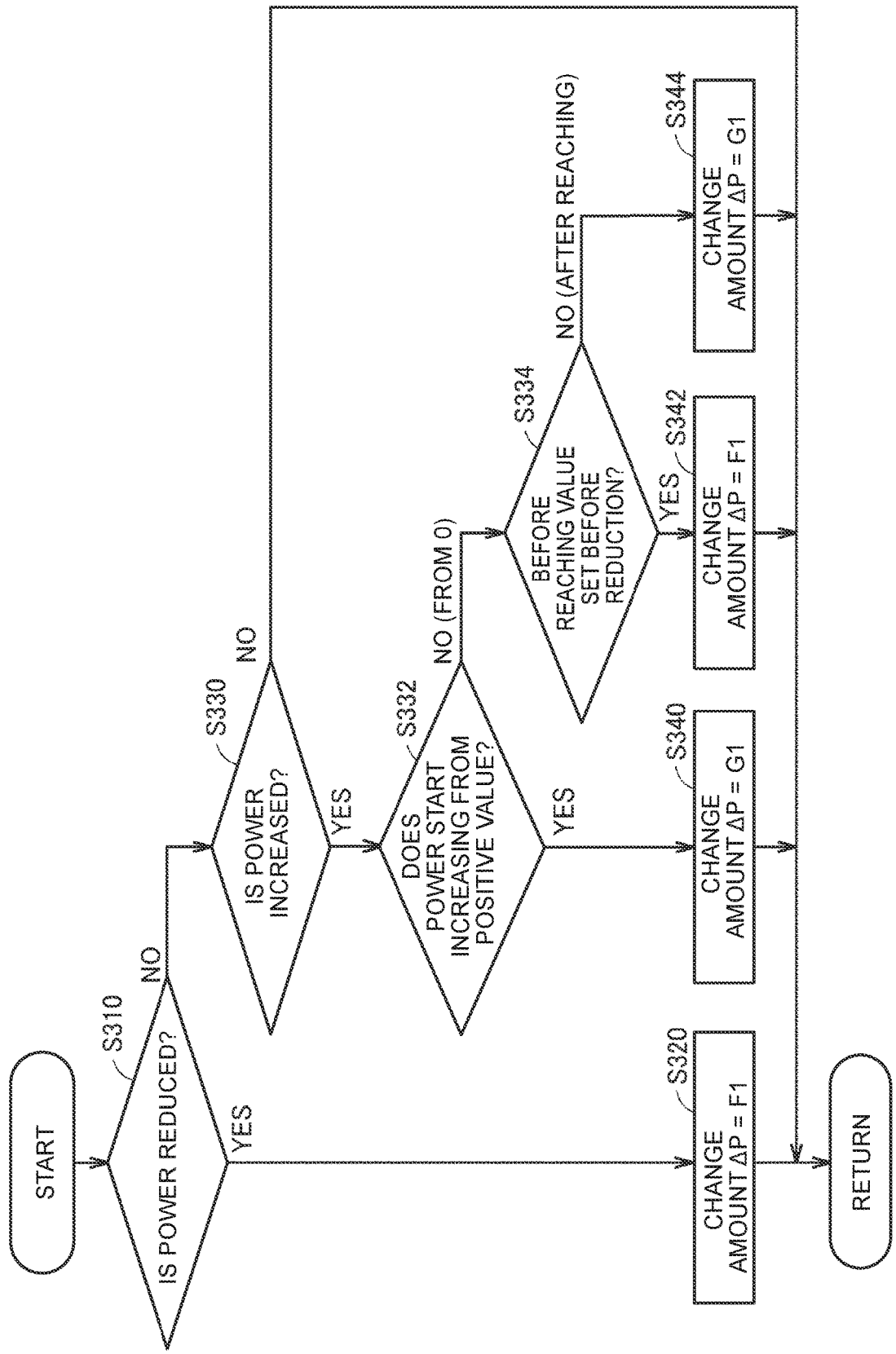
FIG. 11 is a flowchart for illustrating a method of setting a change amount by which command electric power is changed in the modified example of the second embodiment.

FIG. 11 is a flowchart for illustrating a method of setting the change amount ΔP of the command electric power P in the modified example of the second embodiment. This flowchart differs from the flowchart in the second embodiment (see FIG. 9) in that processing in S334 and processing in S344 are included.

With reference to FIG. 10 and FIG. 11, in S332, the ECU 100 determines whether the command electric power P starts to be increased (e., starts increasing) from the positive value. If the command electric power P starts to be increased from the positive value (YES in S332), the change amount ΔP is set to G1 (or G2) (S340), as in the second embodiment.

Meanwhile, in this modified example, if the command electric power P starts to be increased from P=0 (NO in S332), the ECU 100 further determines whether the increase in the command electric power P occurs before the command electric power P reaches the value set before the reduction to 0 or after the command electric power P reaches the value set before the reduction to 0 (S334). If the increase in the command electric power P occurs before the command electric power P reaches the value set before the reduction to 0 (YES in S334), the change amount ΔP is set to F1 (or F2) (S342, see the time t67 and t68). On the other hand, if the increase in the command electric power P occurs after the command electric power P reaches the value set before the reduction to 0 (NO in S334), the change amount ΔP is set to G1 (or G2) (S344, see the time t69 to t70).

Note that, in the offset learning control, the command electric power P is reduced from the target electric power TAG to 0 and then is returned from 0 to the target electric power TAG. That is, the command electric power P is not increased to a value higher than the value set before the reduction to 0. Thus, the change amount ΔP after the offset learning control is set by executing the processing in S342 after the positive determination is made in S334.

In addition, there is a case where the offset learning control is executed in the state where the command electric power P is lower than the target electric power TAG. In this case, if the command electric power P is increased stepwise by G1 before execution of the offset learning control, the command electric power P is also increased stepwise by G1 from the value set before execution of the offset learning control (i.e., from the value set before the command electric power P is reduced) after execution of the offset learning control. Meanwhile, in the case where the control flag CP is turned on and the command electric power P becomes constant, the command electric power P after execution of the offset learning control is returned to the value set before execution of the offset learning control (i.e., the constant value). Furthermore, also in the case where the command electric power P is limited by the input limit control, the command electric power P after execution of the offset learning control is returned to the value set before execution of the offset learning control (i.e., the value limited by the input limit control).

As has been described so far, according to the modified example of the second embodiment, in the case where the command electric power P is increased from 0, the change amount ΔP is set to F1 (or F2) until the command electric power P is returned to the value set before the reduction to 0. After the command electric power P is returned to the value set before the reduction to 0 (from the time t69 onward), the change amount ΔP is set to G1 (or G2). Thus, in the period until the command electric power P is returned to the value set before the reduction to 0, occurrence of the flicker in the system power supply 900 is prevented, and the charging period can be reduced as compared to the case where the command electric power P is increased stepwise by G1. Furthermore, after the command electric power P reaches the value set before the reduction to 0, the battery 10 can be charged until the battery 10 is brought to the nearly full-charge state.

Note that, in the first and second embodiments, the electric power is supplied from the system power supply 900. However, a power supply is not limited to the system power supply 900, and may be an AC power supply (a DC-AC converter or the like) or a DC power supply such as another electric power storage device.

It should be understood that the embodiments disclosed herein are illustrative in all respects and not restrictive.

What is claimed is:

1. A vehicle comprising:
   an electric power converter configured to convert electric power supplied from an external power supply;
   an electric power storage device having internal resistance higher than a specified value, the electric power storage device being configured to store the electric power converted by the electric power converter; and
   a control unit configured to control the electric power converter such that the electric power corresponding to command electric power is supplied from the external power supply and constant power charging of the electric power storage device is performed, wherein
   the control unit is configured to
   i) increase the command electric power stepwise by a specified reference amount toward target electric power,
   ii) after the command electric power reaches the target electric power, reduce the command electric power each time a voltage of the electric power storage device exceeds a first threshold voltage, and
   iii) stop supply of the electric power from the external power supply when the voltage of the electric power storage device reaches a second threshold voltage that is higher than the first threshold voltage, and
   the specified reference amount is set such that an increased amount of the voltage of the electric power storage device at each step of increasing the command electric power is smaller than a voltage difference between the second threshold voltage and the first threshold voltage.

2. The vehicle according to claim 1, wherein:
   the external power supply is a system power supply;
   the control unit is configured to execute first increase control that increases the command electric power stepwise by the specified reference amount, and second increase control that increases the command electric power stepwise by a specified increase amount that is larger than the specified reference amount and is smaller than an increase amount that causes a flicker in the system power supply; and
   the control unit is configured to execute the second increase control in a case where the command electric power is increased again toward the target electric power after the command electric power is reduced to zero, and to execute the first increase control in a case where the command electric power is increased again toward the target electric power after the command electric power is reduced such that the command electric power does not reach zero.

3. The vehicle according to claim 2, wherein:
   the control unit is configured to execute the second increase control until the command electric power reaches a positive value from zero and to execute the first increase control until the command electric power reaches the target electric power from the positive value, in a case where the command electric power is increased again toward the target electric power after the command electric power is reduced from the positive value to zero.

4. The vehicle according to claim 2 further comprising:
   a current sensor configured to detect a current flowing into and out of the electric power storage device, wherein
   the control unit is configured to periodically reduce the command electric power to zero, and to acquire a value of the current sensor that is detected in a state where the command electric power is zero, as an offset value of the current sensor.

5. A method of charging an electric power storage device with electric power supplied from an external power supply, the electric power storage device being provided in a vehicle and having internal resistance higher than a specified value, and the vehicle including an electric power converter configured to convert the electric power supplied from the external power supply and to perform constant power charging of the electric power storage device,
   the method comprising:
   increasing command electric power for the electric power converter stepwise by a reference amount toward target electric power;
   after the command electric power reaches the target electric power, reducing the command electric power each time a voltage of the electric power storage device exceeds a first threshold voltage; and
   stopping supply of the electric power from the external power supply when the voltage of the electric power storage device reaches a second threshold voltage that is higher than the first threshold voltage, wherein
   the reference amount is set such that an increased amount of the voltage of the electric power storage device at each step of increasing the command electric power is smaller than a voltage difference between the second threshold voltage and the first threshold voltage.

* * * * *

UNITED STATES PATENT AND TRADEMARK OFFICE
CERTIFICATE OF CORRECTION

PATENT NO. : 10,988,043 B2  
APPLICATION NO. : 16/267866  
DATED : April 27, 2021  
INVENTOR(S) : Masaru Kimura Page 1 of 1

It is certified that error appears in the above-identified patent and that said Letters Patent is hereby corrected as shown below:

In the Specification

In Column 9, Line (s) 35, delete "($\Delta P=F$) and insert --($\Delta P=F1$)--, therefor.
In Column 10, Line (s) 17, after "sensor", delete "1" and insert --11--, therefor.
In Column 12, Line (s) 44, delete "830" and insert --S30--, therefor.
In Column 13, Line (s) 11, delete "880" and insert --S80--, therefor.
In Column 13, Line (s) 12, delete "TH12" and insert --TH2--, therefor.
In Column 13, Line (s) 14, delete "880" and insert --S80--, therefor.
In Column 15, Line (s) 5, before "each", delete "G" and insert --G1--, therefor.

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*